(12) United States Patent
Mochizuki et al.

(10) Patent No.: US 7,547,036 B2
(45) Date of Patent: Jun. 16, 2009

(54) DRAWBAR DEVICE FOR TOW VEHICLE

(75) Inventors: Akira Mochizuki, Kariya (JP); Takanori Mizuno, Kiyosu (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 113 days.

(21) Appl. No.: 11/544,482

(22) Filed: Oct. 6, 2006

(65) Prior Publication Data

US 2007/0096431 A1  May 3, 2007

(30) Foreign Application Priority Data

Oct. 7, 2005  (JP) ............... 2005-295392

(51) Int. Cl.
*B60D 1/02* (2006.01)
(52) U.S. Cl. .............. 280/515; 280/507; 280/508
(58) Field of Classification Search ............. 280/515, 280/504, 506, 507, 512, 514, 490.1
See application file for complete search history.

(56) References Cited

U.S. PATENT DOCUMENTS

| | | | | |
|---|---|---|---|---|
| 3,874,704 A | * | 4/1975 | Williams | 280/479.1 |
| 4,015,855 A | * | 4/1977 | Murray | 280/416.2 |
| 4,389,058 A | * | 6/1983 | Cadwell | 280/416.2 |
| 4,431,207 A | * | 2/1984 | Langenfeld et al. | 280/416.2 |
| 5,083,808 A | * | 1/1992 | Torii | 280/507 |
| 5,286,050 A | * | 2/1994 | Stallings et al. | 280/477 |
| 6,981,716 B2 | * | 1/2006 | Takeda | 280/515 |
| 7,429,057 B2 | * | 9/2008 | Johns et al. | 280/477 |
| 2003/0116940 A1 | * | 6/2003 | Takeda | 280/515 |

FOREIGN PATENT DOCUMENTS

| | | | |
|---|---|---|---|
| JP | 56-73608 | | 6/1981 |
| JP | 62110503 A | * | 5/1987 |
| JP | 02197408 A | * | 8/1990 |
| JP | 03243409 A | * | 10/1991 |
| JP | 09-315118 | | 12/1997 |
| JP | 9-315119 | | 12/1997 |

OTHER PUBLICATIONS

Korean Office Action dated Aug. 16, 2007, received in corresponding Korean Patent Application No. 2006-0097546 without English translation.

* cited by examiner

*Primary Examiner*—Paul N Dickson
*Assistant Examiner*—Marc A Scharich
(74) *Attorney, Agent, or Firm*—Locke Lord Bissell & Liddell LLP

(57) ABSTRACT

A drawbar device for a tow vehicle having a vehicle body and a hood operable to open and close for covering a top surface of a rear portion of the vehicle body includes a drawbar bracket, a drawbar pin, an operation lever and a link mechanism. The drawbar bracket is provided on the vehicle body. The drawbar pin is provided at the drawbar bracket so as to be movable upward and downward. The operation lever is provided on the hood so as to be manually operated. The link mechanism is operable to move the drawbar pin upward according to operation of the operation lever.

10 Claims, 9 Drawing Sheets

DRAWBAR DEVICE FOR TOW VEHICLE

BACKGROUND OF THE INVENTION

The present invention relates to a drawbar device for a tow vehicle such as a compact tow car, a towing tractor and the like.

A conventional drawbar device for a tow vehicle will be described with reference to FIG. 9. FIG. 9 is a right side view of the rear portion of a tow car as the tow vehicle. The tow car 101 is a battery type compact tow car equipped with a hood 115 as a battery hood which is operable to open and close for covering the top surface of the rear portion (or a rear frame 105) of the vehicle body 102 thereof. The hood 115 is pivoted clockwise as seen in FIG. 9 about a hinge axle 116 that is rotatably connected to the rear frame 105, thus being opened to be in an upright position as shown by the two-dot chain line in FIG. 9. An operator's seat 118 is provided on the hood 115 for an operator to sit thereon.

A drawbar device 130 is provided at the rear of the rear frame 105 of the vehicle body 102 for connecting thereto a towed vehicle (not shown) such as a trailer or the like. The drawbar device 130 includes a drawbar bracket 132 provided on the rear surface of the rear frame 105, a drawbar pin 135 provided at the drawbar bracket 132 so as to be movable upward and downward, and a link mechanism 140 operable to move the drawbar pin 135 according to the operation of an operation lever 138. The operation lever 138 is supported by a lever bracket 142 located on the rear end of the rear frame 105 so as to be pivotable about a support pin 143. The link mechanism 140 includes a drawbar lever 146 provided integrally at the proximal end of the operation lever 138 and a drawbar link 147 that connects the drawbar lever 146 to the drawbar pin 135. The drawbar link 147 is pivotally connected at its upper end to the drawbar lever 146 through a connecting pin 148 and at its lower end to a link-connecting portion 137 of the drawbar pin 135 through a connecting pin 149.

In the drawbar device 130 of the tow car 101, the operation lever 138 in its upright position is manually operated to incline to the position indicated by the two-dot chain line in FIG. 9 by pushing a knob 139 forward and downward, namely, in the direction of the arrow Y in FIG. 9. Thus, the drawbar pin 135 is operated through the link mechanism 140 or moved upward. In this state, the connection portion 170 of a towed vehicle (not shown) such as a trailer or the like can be removed from or inserted into the drawbar bracket 132. With the connection portion 170 of the towed vehicle inserted in the drawbar bracket 132, the operation lever 138 is released from the operating force and then the drawbar pin 135 moves downward due to its own weight. The connecting portion 170 of the towed vehicle is pivotally connected to the drawbar bracket 132 through the drawbar pin 135 while the operation lever 138 is retuned to its upright position through the link mechanism 140. The above drawbar device of the tow car is disclosed in Japanese Utility Model Publication No. 56-73608.

In the above conventional drawbar device 130, the operation lever 138 is provided on the rear frame 105 of the vehicle body 102 and behind the hood 115 so as to be manually operated. In view of opening of the hood 115 as indicated by the two-dot chain line in FIG. 9, the operation lever 138 has to be located behind and at a distance from the operator's seat 118. If the operation lever 138 is located near the operator's seat 118, the opened hood 115 may collide with the operation lever 138, thereby preventing the opening of the hood 115. Therefore, the operation lever 138 has to be located behind and at a distance from the operator's seat 118 for fully opening the hood 115 as indicated by the two-dot chain line in FIG. 9. However, it is hard for an operator to operate the operation lever 138 that is located at a distance from the operator's seat 118 and the operatability of the operation lever 138 deteriorates.

The present invention is directed to a drawbar device for a tow vehicle that improves the operability of an operation lever.

SUMMARY OF THE INVENTION

According to the present invention, a drawbar device for a tow vehicle having a vehicle body and a hood operable to open and close for covering a top surface of a rear portion of the vehicle body includes a drawbar bracket, a drawbar pin, an operation lever and a link mechanism. The drawbar bracket is provided on the vehicle body. The drawbar pin is provided at the drawbar bracket so as to be movable upward and downward. The operation lever is provided on the hood so as to be manually operated. The link mechanism is operable to move the drawbar pin upward according to operation of the operation lever.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe a preferred embodiment according to the present invention. The preferred embodiment exemplifies a battery type, standing ride type compact tow car as a tow vehicle. It is noted that for convenience of explanation the tow car will be schematically described at first and then a drawbar device will be described.

Figure 1:
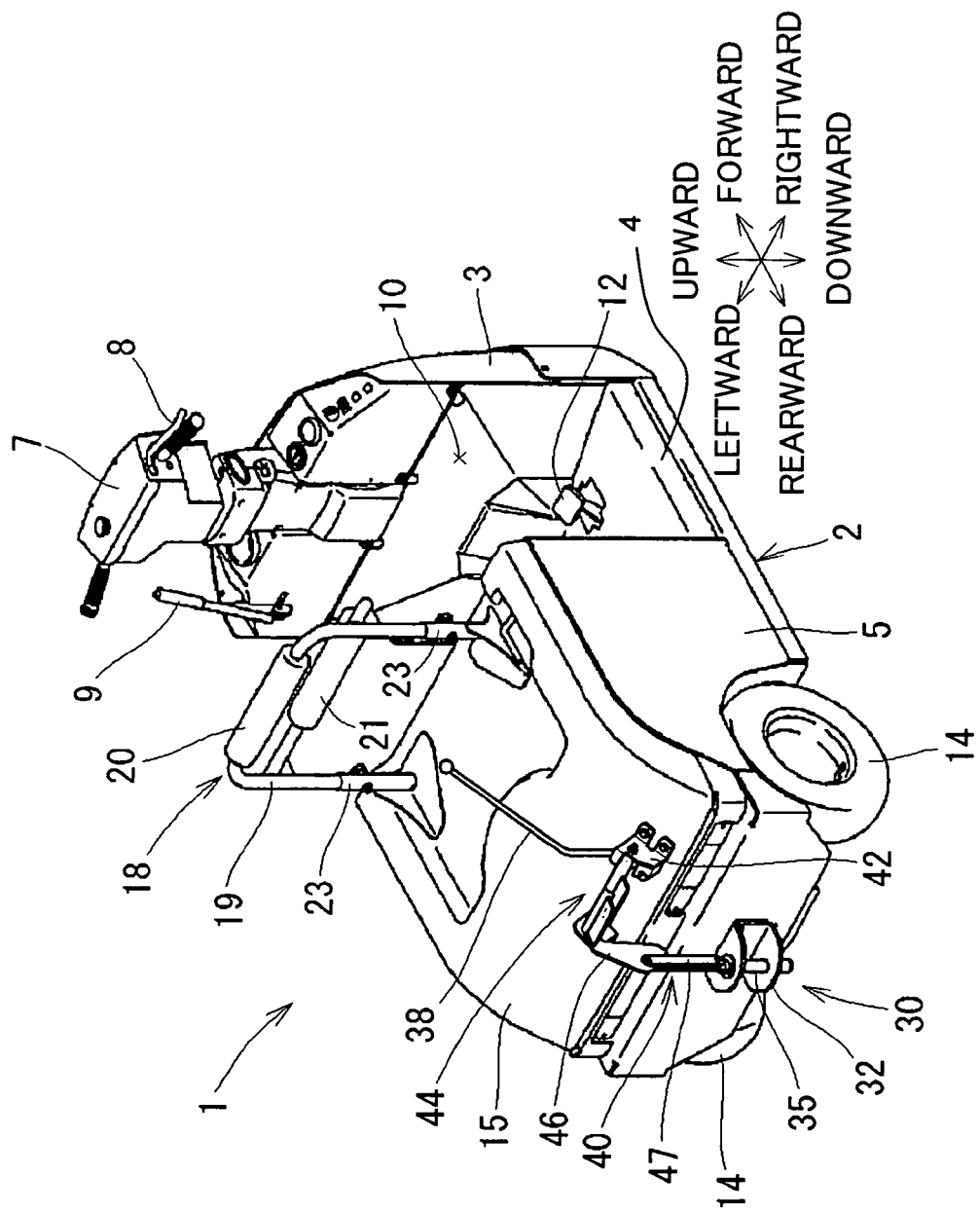
FIG. 1 is a perspective view of a tow car according to a preferred embodiment of the present invention.

Now, the tow car will be schematically described. FIG. 1 is a perspective view of the tow car. It is noted that in the following description the terms "forward," "rearward," "leftward" and "rightward" designate directions as viewed from an operator getting on the tow car and facing in the forward direction of the tow car. Referring to FIG. 1, the tow car 1 has a vehicle body 2 that includes a front frame 3, a rear frame 5 and a floor frame 4 connecting the front frame 3 to the rear frame 5. A T-bar steering handle 7 is provided on the front frame 3. A control lever 8 is provided at the right grip of the steering handle 7. A brake lever 9 of a parking brake device (not shown) is provided at the upper portion of the front frame 3. A front wheel (not shown) as a steered wheel that is steered by the steering handle 7 is provided at the lower portion of the front frame 3.

Figure 6:
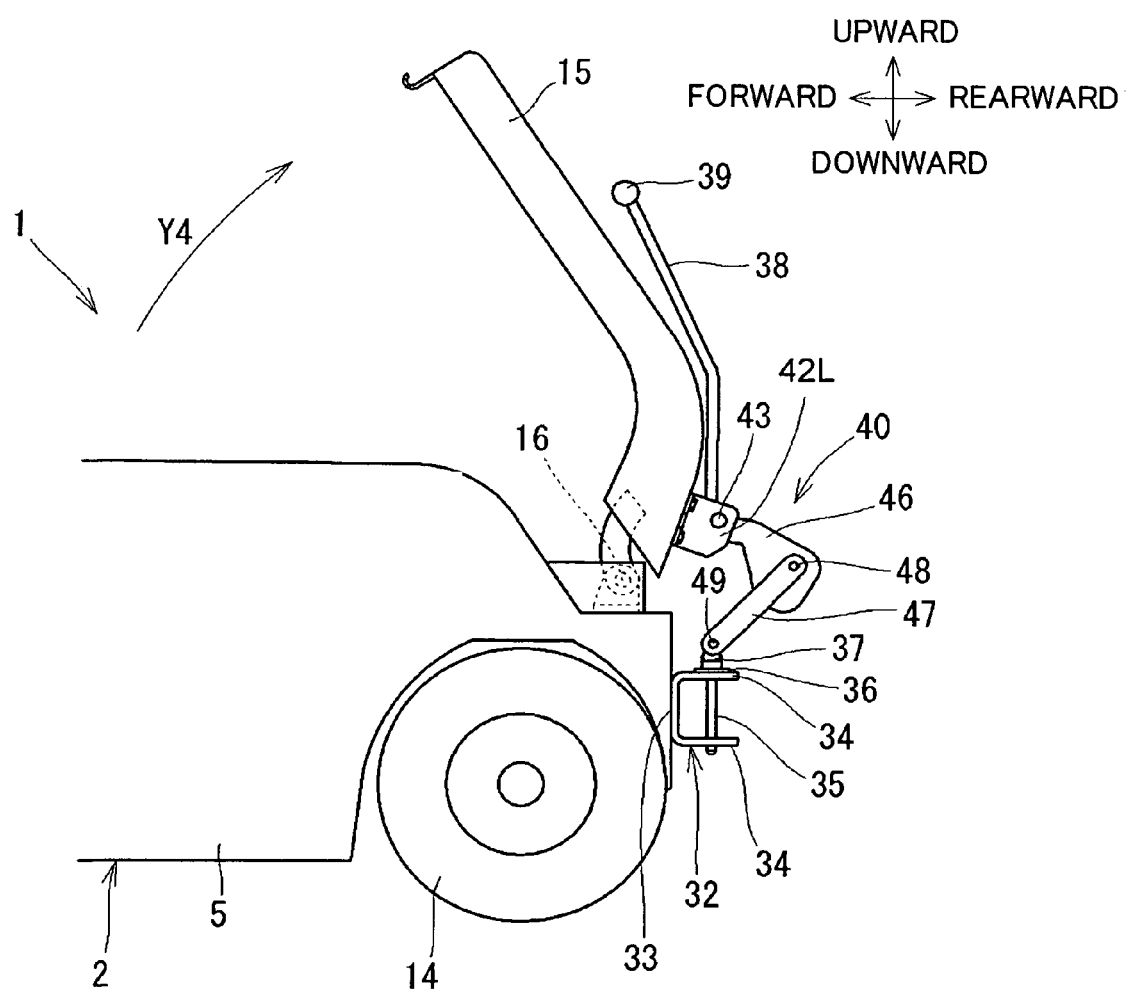
FIG. 6 is a side view of the tow car around the drawbar device when a hood is opened according to the preferred embodiment of the present invention.

An operator's cab 10 is provided above the floor frame 4. The operator's cab 10 is an operator's cab without a sit-down type operator's seat in which an operator stands and operates the tow car 1. The operator's cab 10 has lateral openings for the operator to get on and off the tow car 1. A foot-operated brake pedal 12 is provided on the front portion of the floor frame 4. The rear frame 5 is made in the form of a box having an opening at its top surface and accommodates therein a battery (not shown), a drive unit (not shown) and the like. A pair of rear wheels 14 as driving wheels are provided at the rear frame 5. The top surface of the rear frame 5 is covered by a hood 15 as a battery hood that is operable to open and close. The hood 15 is pivotally connected at its rear end to the rear frame 5 through a hinge axle 16 (cf. FIG. 6). Thus, the hood 15 is pivoted about the hinge axle 16 clockwise as shown in FIG. 6 to be opened in the upright position. The top surface of the rear frame 5 corresponds to the top surface of the rear portion of the vehicle body of the present invention. A damper device (not shown) is provided between the rear frame 5 and the hood 15.

Still referring to FIG. 1, a seat 18 is provided on the front portion of the hood 15 for the operator in the operator's cab 10 to lean thereon, in order to stabilize the operating posture of the operator. The seat 18 includes a seat frame 19 made of a pipe, a backrest pad 20 provided on the seat frame 19 for the operator to lean his or her back thereon, a seat pad 21 provided on the seat frame 19 for the operator to rest his or her buttocks thereon. The seat frame 19 is attached to a pair of support bases 23 placed on the hood 15 so that the height thereof is adjustable. The seat frame 19 can be attached to the support bases 23 so that the seat pad 21 is located facing rearward. A drawbar device 30 is provided at the rear portion of the rear frame 5 of the tow car 1 for connecting thereto a towed vehicle (not shown) such as a trailer or the like.

Figure 2:
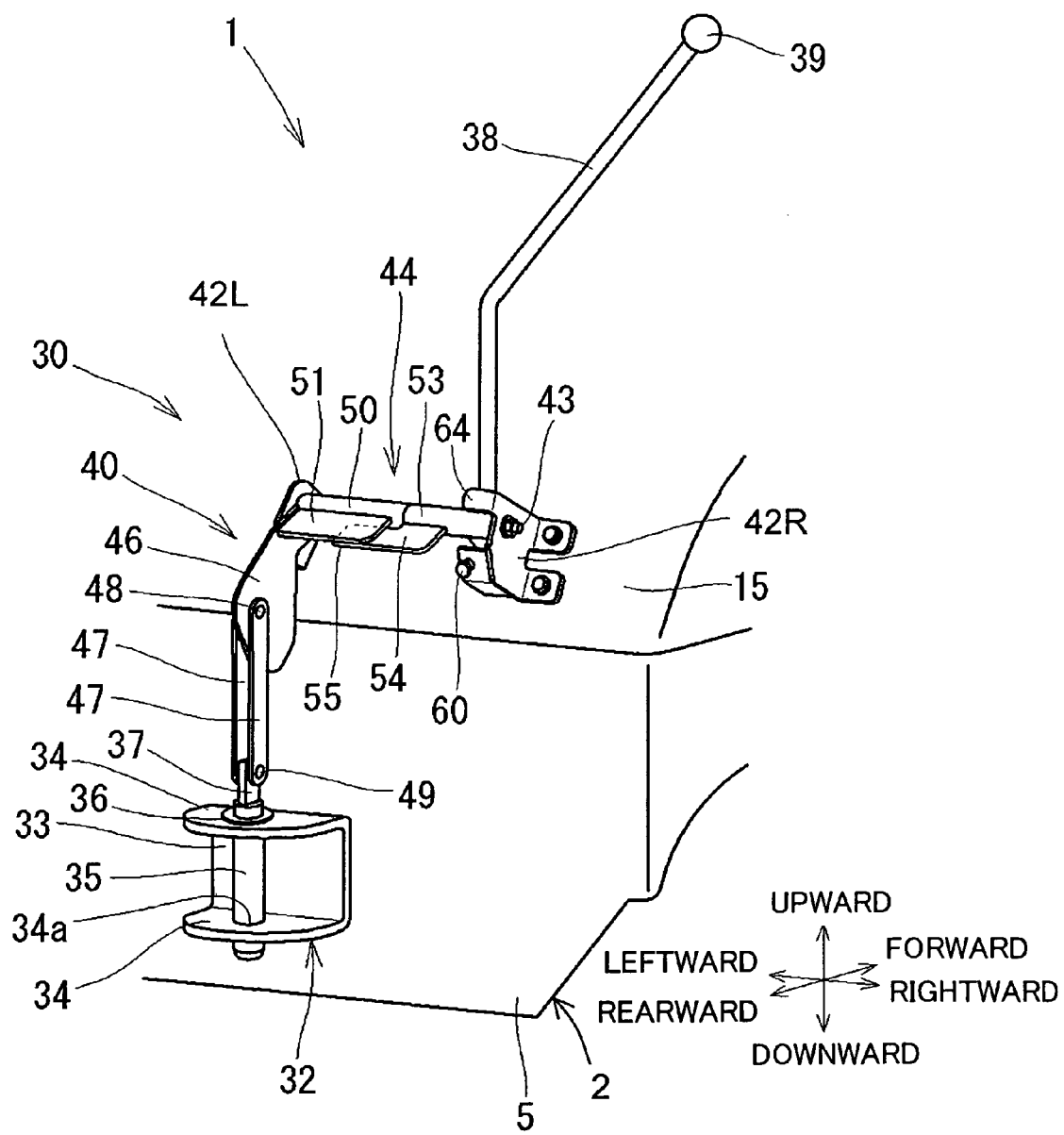
FIG. 2 is a perspective view of the tow car around a drawbar device according to the preferred embodiment of the present invention.
Figure 3:
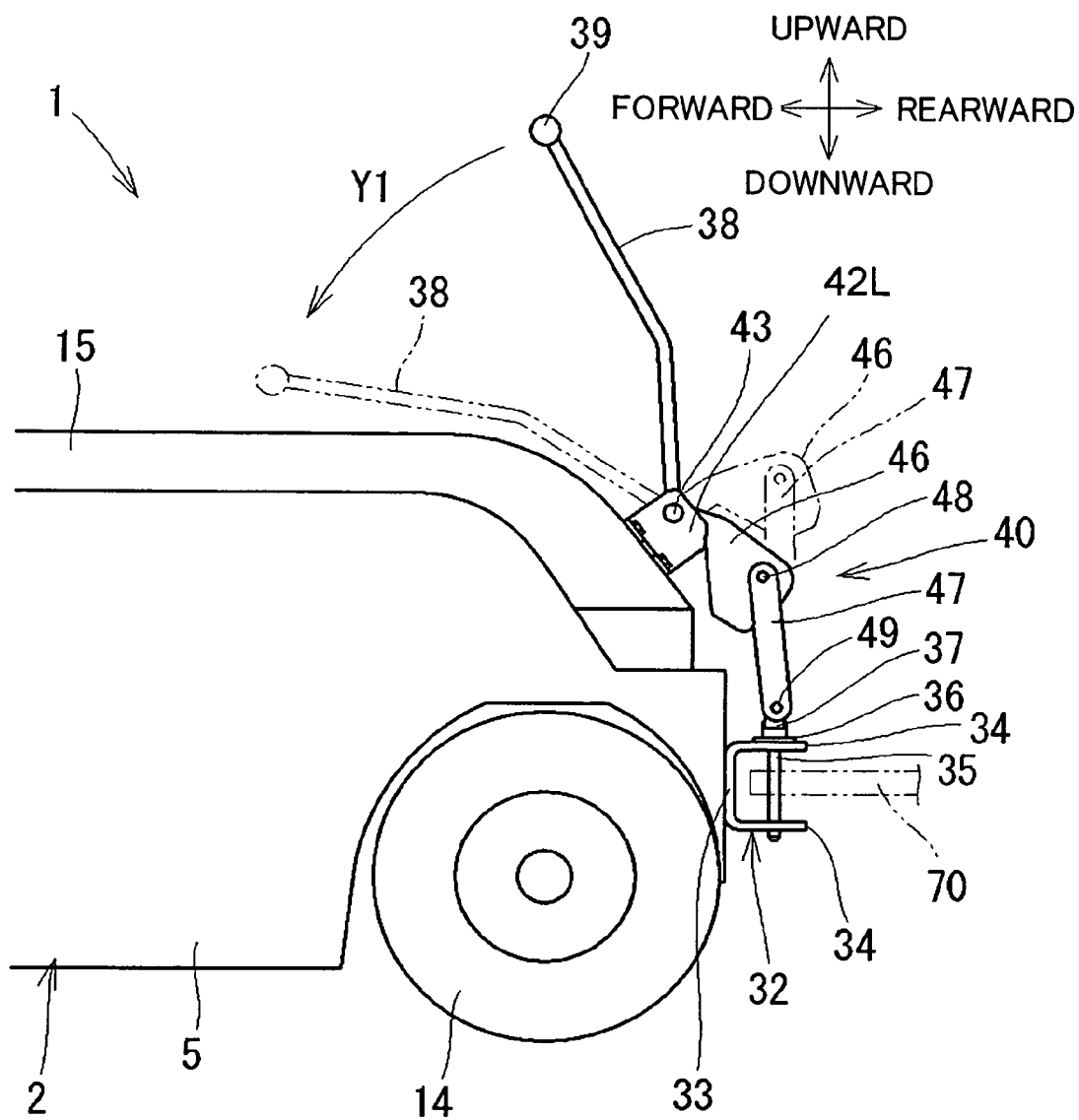
FIG. 3 is a side view of the tow car around the drawbar device according to the preferred embodiment of the present invention.

The following will describe the drawbar device 30 of the tow car 1. FIGS. 2 and 3 are a perspective view and a side view of the tow car around the drawbar device. Referring to FIG. 2, the drawbar device 30 includes a drawbar bracket 32 provided on the rear surface of the rear frame 5 of the vehicle body 2, a drawbar pin 35 provided at the drawbar bracket 32 so as to be movable upward and downward, and a link mechanism 40 operable to operate or move the drawbar pin 35 upward according to the operation of an operation lever 38. The drawbar bracket 32 includes a mounting plate 33 connected to the rear surface of the rear frame 5 through bolts or the likes and a pair of connecting plates 34 extending rearward from the upper and lower ends of the mounting plate 33 in parallel with each other. Each of the connecting plates 34 has a hole 34a. The holes 34a of both connecting plates 34 are coaxial with each other. Only the one hole 34a in the lower connecting plate 34 is shown in FIG. 2. The hole 34a in the upper connecting plate 34 is shown in FIG. 4.

Figure 4:
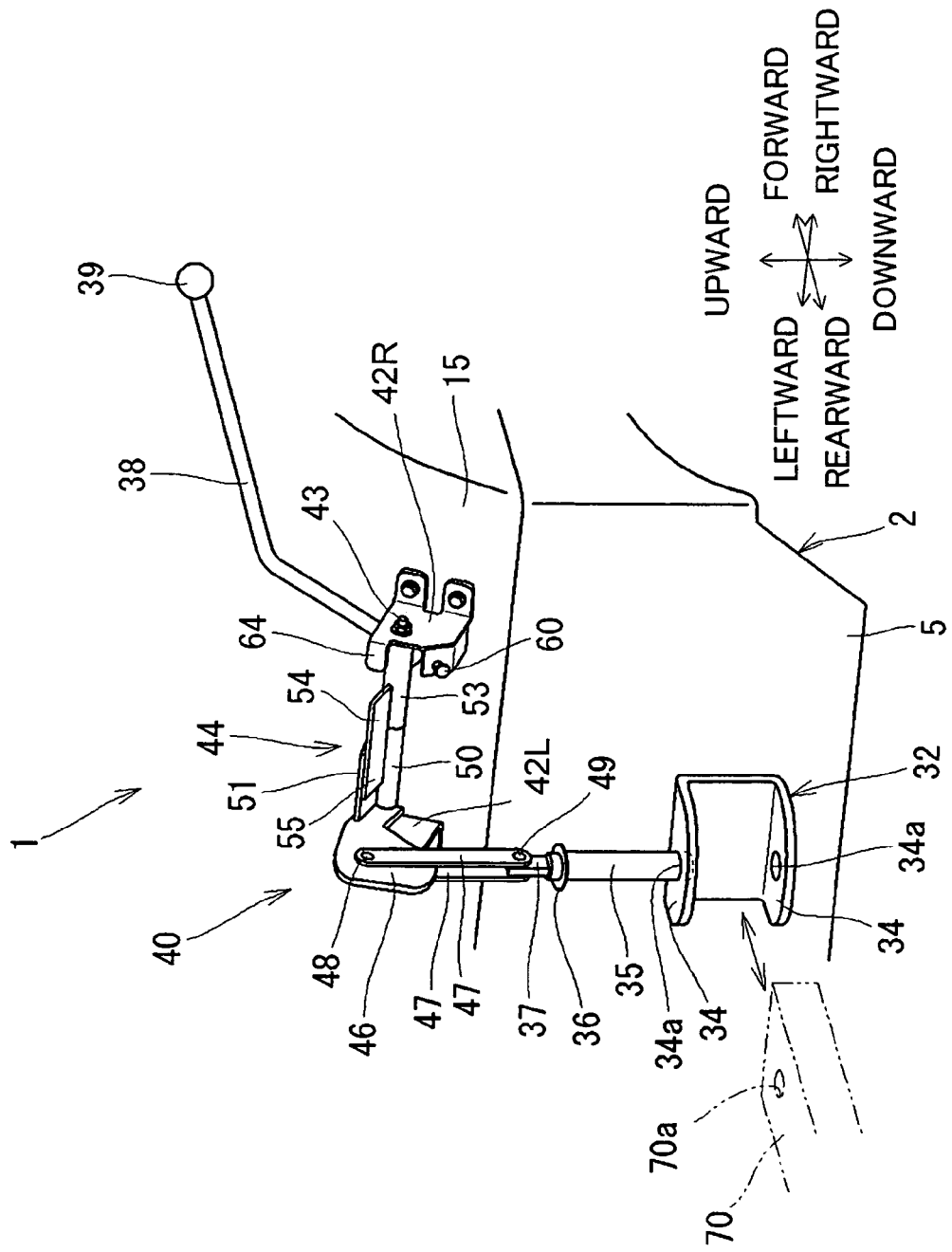
FIG. 4 is a perspective view of the tow car around the drawbar device in its connection-releasing state according to the preferred embodiment of the present invention.

The drawbar pin 35 is installed in the hole 34a of the upper connecting plate 34 of the drawbar bracket 32 by inserting the drawbar pin 35 into the hole 34a from above the upper connecting plate 34 (cf. FIG. 4). The drawbar pin 35 is movable so that the lower end thereof is inserted into and removed from the hole 34a of the lower connecting plate 34. The drawbar pin 35 is formed at its upper end with a flange 36 contactable with the upper connecting plate 34. When the flange 36 is in contact with the upper connecting plate 34, the drawbar pin 35 is inserted at its lower end in the hole 34a of the lower connecting plate 34 and prevented from moving downward further. The drawbar pin 35 has a link-connecting portion 37 extending upward from the flange 36.

The operation lever 38 is pivotally supported through a support pin 43 by a pair of lever brackets 42R and 42L provided on the rear portion of the hood 15. The operation lever 38 extends upward and has at its upper end a knob 39. The operation lever 38 is bent forward in a dogleg shape so that the operation lever 38 is maintained at a certain spaced interval from the hood 15 when the operation lever 38 is inclined to the position indicated by the two-dot chain line in FIG. 3 forward and downward or in the direction of the arrow Y1 in FIG. 3. The supporting structure of the operation lever 38 with respect to the right lever bracket 42R will be described later.

Referring to FIG. 2, the link mechanism 40 connects the operation lever 38 to the drawbar pin 35. The link mechanism 40 includes an interlock mechanism 44 operatively connected to the operation lever 38, a drawbar lever 46 operated through the interlock mechanism 44, a drawbar link 47 connecting the drawbar lever 46 to the drawbar pin 35. The drawbar link 47 is pivotally connected at its upper end to the drawbar lever 46 through a connecting pin 48 and at its lower end to the link-connecting portion 37 of the drawbar pin 35 through a connecting pin 49. The drawbar link 47 includes symmetrically-located two plates between which the drawbar lever 46 and the link-connecting portion 37 of the drawbar pin 35 are sandwiched.

Figure 7:
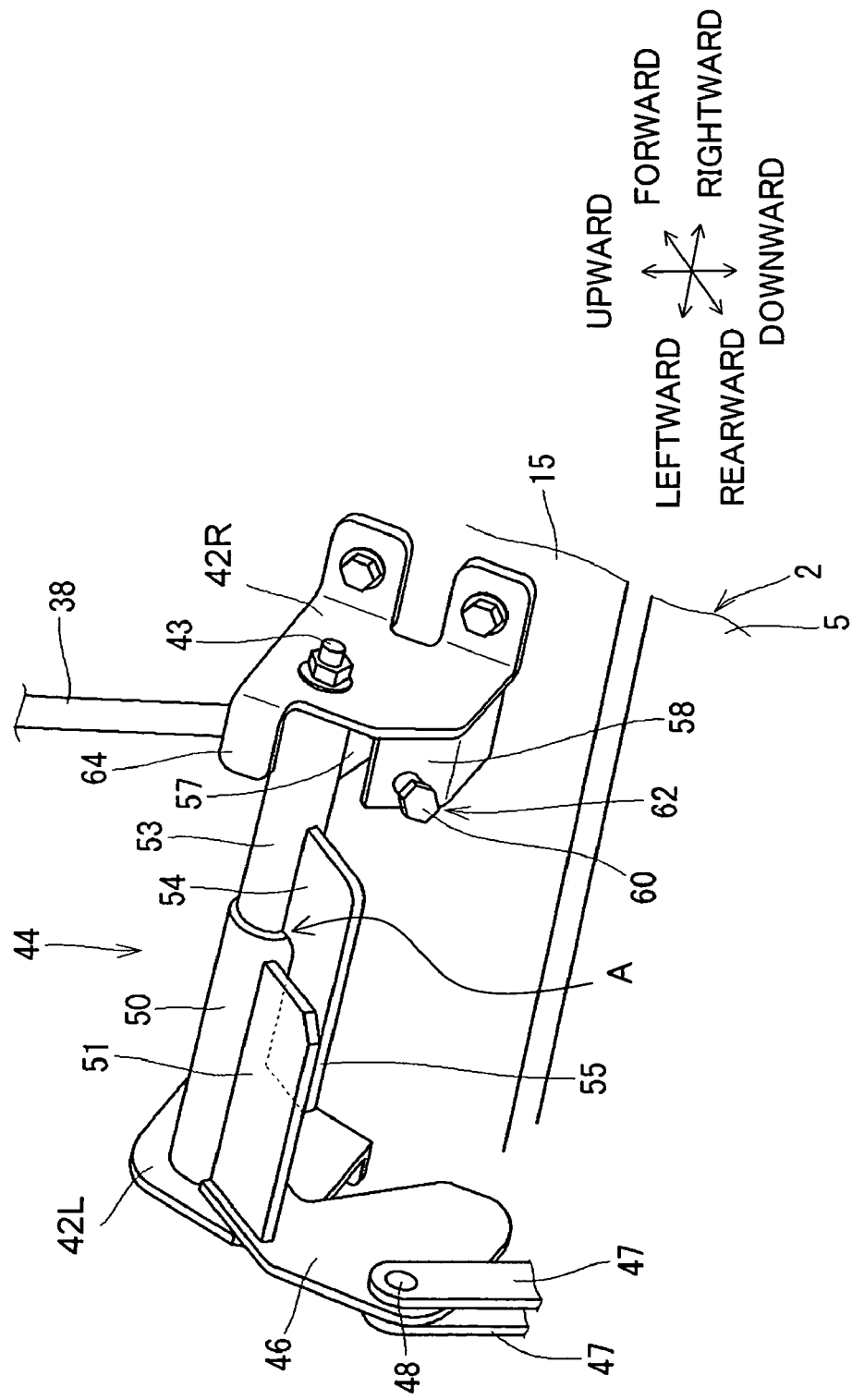
FIG. 7 is a perspective view of the tow car around an interlock mechanism showing a supporting structure of an operation lever according to the preferred embodiment of the present invention.
Figure 8:
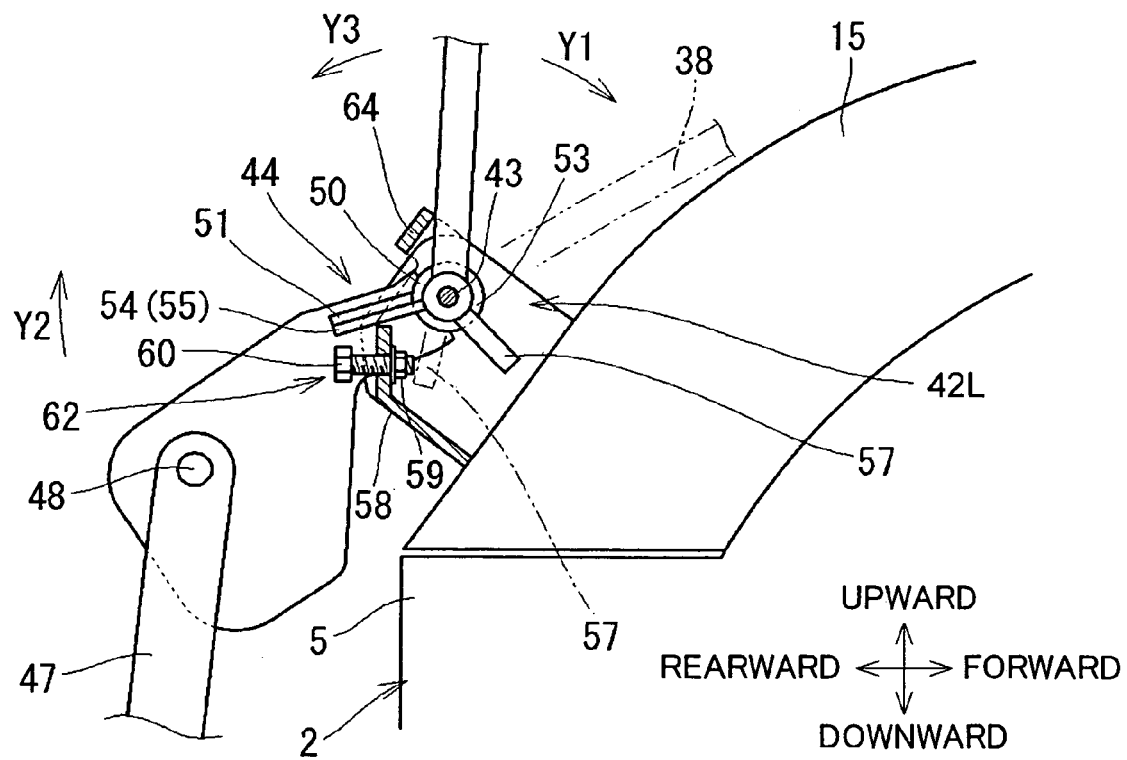
FIG. 8 is a cross-sectional side view of the tow car around the interlock mechanism showing the supporting structure of the operation lever according to the preferred embodiment of the present invention.
Figure 9:
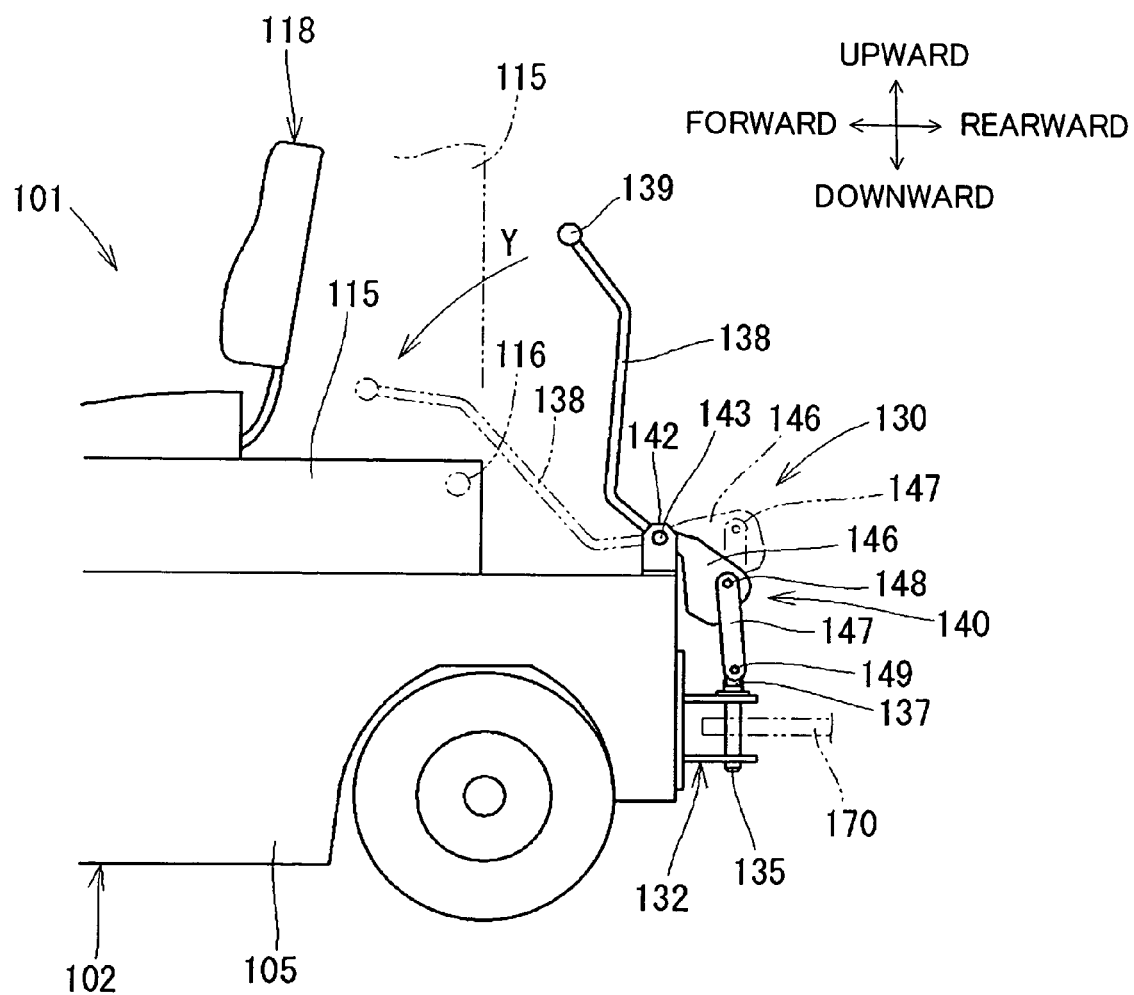
FIG. 9 is a side view of the rear portion of a tow car according to prior art.

The following will describe the interlock mechanism 44 as well as the supporting structure of the operation lever 38 with respect to the lever brackets 42R and 42L. FIGS. 7 and 8 are a perspective view and a cross-sectional side view of the tow car around the interlock mechanism showing the supporting structure of the operation lever. Referring to FIG. 7, the lever brackets 42R and 42L are fixed to the rear portion of the hood 15 by bolts or the likes. The support pin 43 is inserted through and located between the lever brackets 42R and 42L, and second and first cylinders 50 and 53 are rotatably supported on the support pin 43. The second cylinder 50 is located partially around the first cylinder 53. The second cylinder 50 is supported in the left side between the lever brackets 42R and 42L so as to be rotatable relative to the first cylinder 53. The first cylinder 53 at its right side is exposed from the second cylinder 50 to the right side between the lever brackets 42R and 42L. The drawbar lever 46 is secured to the left end of the second cylinder 50. A plate 51 is secured to the outer circumferential surface of the second cylinder 50. The plate 51 extends in the axial direction of the second cylinder 50 and projects rearward. The operation lever 38 is secured to the outer circumferential surface of the first cylinder 53 adjacent to its right end. A plate 54 is secured to the outer circumferential surface of the right portion of the exposed first cylinder 53. The plate 54 extends in the axial direction of the first cylinder 53 and projects rearward. The plate 54 has a stopper 55 projecting so as to face the lower surface of the right portion of the plate 51. The second and first cylinders 50 and 53 are respectively prevented from moving further axially rightward and leftward by contact of the left end surface of the plate 54 and the right end surface of the second cylinder 50 as indicated by the arrow A in FIG. 7. The second cylinder 50 is prevented from moving axially leftward by the left lever bracket 42L. The first cylinder 53 is prevented from moving axially rightward by the right lever bracket 42R. In other words, the second and first cylinders 50 and 53 are provided between the lever brackets 42R and 42L so that the second and first cylinders 50 and 53 are prevented from moving axially but rotatable on the support pin 43. The plates 51 and 54 correspond to the contact portions of the interlock mechanism of the present invention.

When the operation lever 38 is inclined from its upright position frontward and downward or in the direction of the arrow Y1 in FIG. 8, the stopper 55 of the plate 54 comes into contact with the plate 51 so that the second cylinder 50 is interlocked with the first cylinder 53, thus the first cylinder 53 being rotated clockwise with the second cylinder 50. Accordingly, the drawbar lever 46 is pivoted in the same direction or in the direction of the arrow Y2 in FIG. 8. If a pivoting force acts on the drawbar lever 46 with the operation lever 38 in its upright position so that the drawbar lever 46 is pivoted clockwise or in the direction of the arrow Y2 in FIG. 8, the plate 51 of the second cylinder 50 is separated from the stopper 55 of the plate 54 of the first cylinder 53. Thus, the interlocking of the second and first cylinders 50 and 53 is cut off. The first cylinder 53 corresponds to the operation member of the present invention. The second cylinder 50 corresponds to the interlock member of the present invention. The plate 54 and the plate 51 comprise the interlock mechanism 44 (cf. FIG. 7).

Referring to FIG. 7, a stopper plate 57 is secured to the outer circumferential surface of the first cylinder 53 adjacent to its right end. The stopper plate 57 extends in the axial direction of the first cylinder 53 and projects rearward and downward when the operation lever 38 is located in its upright position (cf. FIG. 8). The right lever bracket 42R is formed at its rear portion with a support member 58 projecting leftward. A nut 59 is secured to the upper portion of the support member 58 by welding as shown in FIG. 8. A hexagon-headed adjusting screw 60 is screwed in the nut 59 of the support member 58. When the operation lever 38 is inclined from its upright position forward and downward or in the direction of the arrow Y1 in FIG. 8, the stopper plate 57 comes into contact with the distal end of the adjusting screw 60 as indicated by the two-dot chain line in FIG. 8. Thus, the operation lever 38 is prevented from being inclined further than an operation-complete position that is defined as a position of the operation lever 38 when the stopper plate 57 is in contact with the distal end of the adjusting screw 60. The operation-complete position of the operation lever 38 corresponds with an operation-complete position of the drawbar pin 35 at which the upward movement of the drawbar pin 35 is completed. The position where the stopper plate 57 is in contact with the adjusting screw 60 is adjusted by screwing the adjusting screw 60 in the nut 59 back or forth, thereby adjusting the operation-complete position of the operation lever 38. The stopper plate 57, the support member 58 and the adjusting screw 60 comprise a position-adjusting mechanism 62. The right lever bracket 42R correspond to the fixing member of the present invention.

Still referring to FIG. 7, a stopper member 64 is formed at the front portion of the right lever bracket 42R projecting leftward therefrom. When the operation lever 38 is inclined rearward or in the direction of the arrow Y3 in FIG. 8, the operation lever 38 comes into contact with the stopper member 64 thereby preventing the operation lever 38 from being inclined rearward further than its most-rearward-inclined position.

In the drawbar device 30 of the tow car 1, when the operation lever 38 is located in its upright position with the hood 15 closed as shown in FIGS. 2 and 3, the drawbar pin 35 is located in its lowest position or its connection position and inserted in the holes 34a of the connecting plates 34 of the drawbar bracket 32. In the interlock mechanism 44, the plate 51 and the stopper 55 of the plate 54 are in contact with each other. In this state, the operation lever 38 is inclined to the position indicated by the two-dot chain line in FIG. 3 by pushing the knob 39 frontward and downward or in the direction of the arrow Y1 in FIG. 3. During this inclination of the operation lever 38, the first cylinder 53 is rotated with the stopper 55 of the plate 54 in contact with the plate 51, so that the second cylinder 50 is interlocked and rotated with the first cylinder 53. As the second cylinder 50 is rotated, the drawbar lever 46 is pivoted in the direction of the arrow Y2 in FIG. 8. Thus, the drawbar link 47 is moved upward while the drawbar pin 35 is operated or moved upward. When the lower end of the drawbar pin 35 reaches the hole 34a of the upper connecting plate 34 of the drawbar bracket 32, the drawbar pin 35 is located in its operation-complete position as shown in FIG. 4. Along with this, when the stopper plate 57 of the first cylinder 53 comes into contact with the adjusting screw 60, the operation lever 38 is located in its operation-complete position as indicated by the two-dot chain line in FIG. 8. This state corresponds to a connection-releasing state of the drawbar device 30. FIG. 4 is a perspective view showing the connection-releasing state of the drawbar device 30.

In the connection-releasing state of the drawbar device 30 as shown in FIG. 4, the connecting portion 70 such as a towbar, a hitch or the like which is provided to the towed vehicle such as a trailer or the like can be inserted into or removed from between the connection plates 34 of the drawbar bracket 32. For towing the towed vehicle, the connecting portion 70 of the towed vehicle is initially inserted into the drawbar bracket 32 so that the hole 70a of the connecting portion 70 is located corresponding to the holes 34a of the connecting plates 34. And then, the operation lever 38 is released and the drawbar pin 35 moves downward due to its own weight. Accordingly, the drawbar pin 35 is inserted into the hole 34a of the lower connecting plate 34 of the drawbar bracket 32 through the hole 70a of the connecting portion 70 of the towed vehicle and the flange 36 comes into contact with the upper connecting plate 34. Thus, the connecting portion 70 of the towed vehicle is pivotally connected to the drawbar bracket 32 through the drawbar pin 35 as shown in FIG. 3.

As the drawbar pin 35 moves downward, the operation lever 38 is moved to its upright position through the link mechanism 40. More specifically, as the drawbar pin 35 moves downward, the drawbar link 47 is moved downward. Accordingly, the drawbar lever 46 is pivoted downward while the second cylinder 50 is rotated. As the second cylinder 50 is rotated with the plate 51 of the second cylinder 50 in contact with the stopper 55 of the plate 54, the first cylinder 53 is interlocked and rotated with the second cylinder 50. Therefore, the operation lever 38 is pivoted to its upright position or its original position as shown in FIGS. 2 and 3. The operation lever 38 is prevented from being inclined rearward further than its upright position or its most-rearward-inclined position by contact of the operation lever 38 with the stopper member 64 of the right lever bracket 42R.

Figure 5:
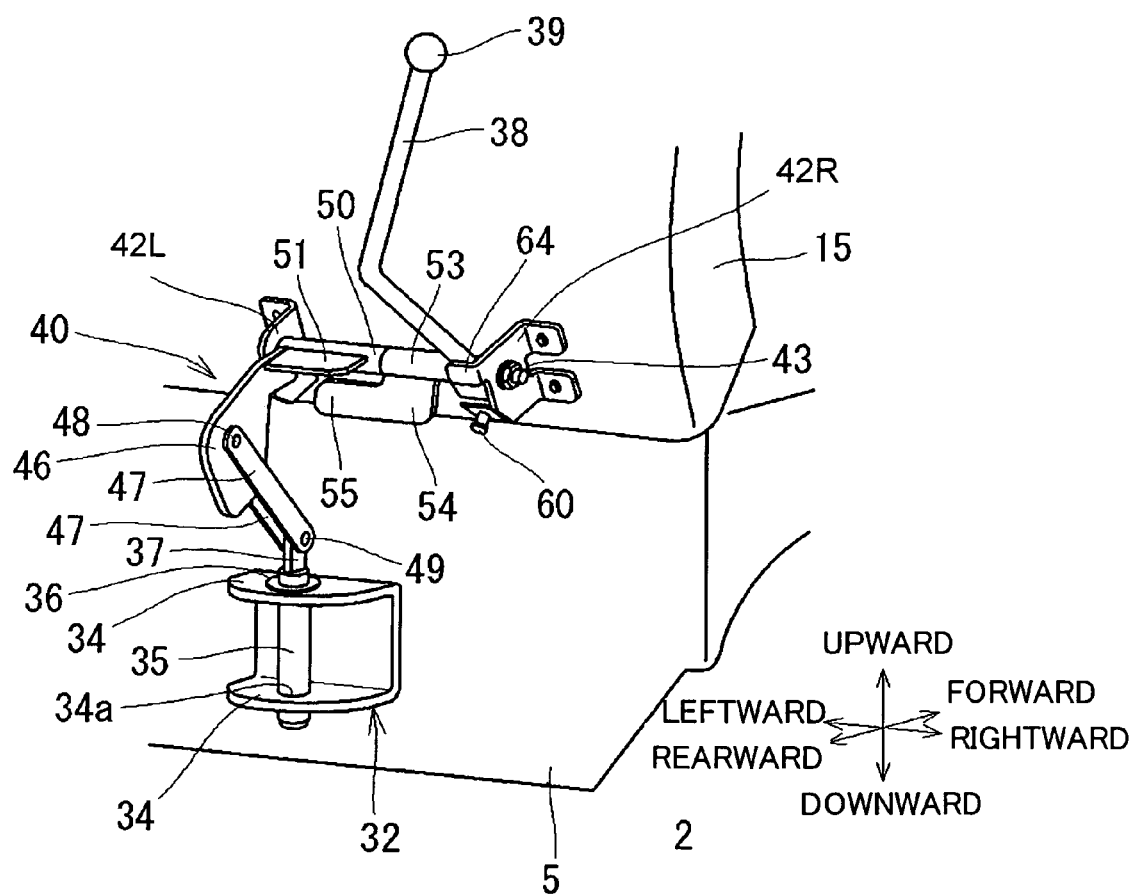
FIG. 5 is a perspective view of the tow car around the drawbar device when a hood is opened according to the preferred embodiment of the present invention.

The following will describe the case where, with the operation lever 38 in its upright position, the hood 15 is pivoted about the hinge axle 16 in the direction of the arrow Y4 in FIG. 6 to be opened for performing maintenance on the battery and the drive unit. FIGS. 5 and 6 are a perspective view and a side view showing the drawbar device with the hood opened. Referring to FIGS. 5 and 6, as the hood 15 is opened, the operation lever 38 and the lever brackets 42R and 42L on the hood 15, the support pin 43 and the second and first cylinders 50 and 53 are moved around the hinge axle 16 (cf. FIG. 6). During this movement, the second cylinder 50 is rotated relative to the first cylinder 53 so that the plate 51 of the second cylinder 50 is separated from the stopper 55 of the plate 54 of the first cylinder 53, thereby cutting off the interlocking of the second and first cylinders 50 and 53. Along with this, the drawbar link 47 connecting the drawbar lever 46 to the drawbar pin 35 is pivoted about the connecting pin 48 clockwise in FIG. 6 relative to the drawbar lever 46 and pivoted about the connecting pin 49 clockwise in FIG. 6 relative to the drawbar pin 35, thereby absorbing the movement of the drawbar lever 46 relative to the drawbar pin 35. Therefore, the drawbar pin 35 is not operated or moved upward and remains to be inserted in the holes 34a of the connecting plates 34. It is noted that when the hood 15 is closed from its opened state, the movement is performed in the reversed manner to the above movement.

According to the drawbar device 30 of the tow car 1, since the operation lever 38 is provided on the hood 15 so as to be manually operated, the hood 15 does not collide with the operation lever 38 when opened. In other wards, the operation lever 38 does not disturb the opening of the hood 15. Thus, the operation lever 38 is located near the operator's cab 10, which enables the operator to easily manually operate the operation lever 38 and hence improves the operability of the operation lever 38.

When the operation lever 38 is manually operated with the hood 15 closed, the second cylinder 50 is interlocked with the first cylinder 53 by the contact of the plate 51 and the plate 54 as the contact portions of the interlock mechanism 44 (cf. FIG. 7). Thus, the drawbar pin 35 can be operated through the link mechanism 40 according to the operation of the operation lever 38. When the hood 15 is opened, the interlocking of the second and first cylinders 50 and 53 is cut off since the plate 51 and the plate 54 of the interlock mechanism 44 are separated from each other. Thus, the unwanted operation of the drawbar pin 35 is prevented when the hood 15 is opened.

The operation-complete position of the operation lever 38 can be adjusted by the position-adjusting mechanism 62 provided between the right lever bracket 42R and the first cylinder 53 (cf. FIGS. 7 and 8).

The present invention is not limited to the above preferred embodiment and may be modified within the scope of the present invention. For example, the drawbar device 30 of the present invention is not limited to the drawbar device for the compact tow car but applicable to other tow vehicles such as a towing tractor and the like. The drawbar device 30 of the present invention is not limited to the drawbar device for the battery type tow vehicle but applicable to an internal combustion engine type tow vehicle having an internal combustion engine as a drive source. The drawbar device 30 of the present invention is not limited to the drawbar device for the standing ride type tow vehicle but applicable to a tow vehicle having a sit-down type operator's seat.

Therefore, the present examples and embodiments are to be considered as illustrative and not restrictive, and the invention is not to be limited to the details given herein but may be modified within the scope of the appended claims.

What is claimed is:

1. A drawbar device for a tow vehicle having a vehicle body, comprising:
   a manually operated operation lever provided on a rear hood of the tow vehicle, the hood operable to open and close for covering a top surface of a rear portion of the vehicle body, wherein a rear end of the hood is pivotally connected to the rear portion of the vehicle body;
   a drawbar bracket provided on the vehicle body;
   a drawbar pin provided at the drawbar bracket so as to be movable upward and downward;
   a link mechanism operable between the operation lever and the drawbar pin to move the drawbar pin; and
   wherein when the hood is closed, the drawbar pin is moved upward according to the operation lever being inclined at a frontward position and downward according to the operation lever being inclined at a rearward position, and wherein when the hood is opened, an interlocking between the operation lever and the drawbar pin is cut off such that the link mechanism is not operable to move the drawbar pin upward.

2. The drawbar device according to claim 1, wherein the link mechanism includes an operation member operatively connected to the operation lever, an interlock member operatively connected to the drawbar pin and an interlock mechanism provided between the operation member and the interlock member and having a pair of contact portions contactable with each other, the interlock member is interlocked with the operation member by contact of the contact portions with each other when the operation lever is manually operated with the hood closed, interlocking of the operation member and the interlock member is cut off by separation of the contact portions from each other when the hood is opened.

3. The drawbar device according to claim 2, further comprising:
   a fixing member provided on the hood; and
   a position-adjusting mechanism provided between the fixing member and the operation member for adjusting an operation-complete position of the operation lever.

4. The drawbar device according to claim 3, wherein the position-adjusting mechanism includes a support member projecting from the fixing member, an adjusting screw screwed in a nut that is secured to the support member, and a stopper plate projecting from the operation member and contactable with the adjusting screw.

5. The drawbar device according to claim 3, wherein a stopper member is formed at the fixing member and contactable with the operation lever for preventing the operation lever from being inclined rearward further.

6. The drawbar device according to claim 2, the operation member is a first cylinder rotatably supported on a support pin that is provided on the hood, the interlock member being a second cylinder rotatably supported on the support pin and located partially around the first cylinder.

7. The drawbar device according to claim 2, wherein the contact portions of the interlock mechanism includes a plate projecting from the operation member and a plate projecting from the interlock member.

8. The drawbar device according to claim 2, wherein the link mechanism includes a drawbar lever connected to the interlock member and a drawbar link connecting the drawbar lever to the drawbar pin.

9. The drawbar device according to claim 8, wherein the drawbar link is pivotally connected at one end to the drawbar lever through a connecting pin and at the other end to the drawbar pin through a connecting pin.

10. The drawbar device according to claim 8, wherein the drawbar lever is secured to the interlock member.

* * * * *